(12) United States Patent
Rosado et al.

(10) Patent No.: US 11,319,260 B2
(45) Date of Patent: May 3, 2022

(54) DETONATING CORD STRESS CONCENTRATORS

(71) Applicant: GOODRICH CORPORATION, Charlotte, NC (US)

(72) Inventors: Jeffrey Rosado, Colorado Springs, CO (US); Matthew Quinn McGee, Mukilteo, WA (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 16/674,747

(22) Filed: Nov. 5, 2019

(65) Prior Publication Data

US 2021/0130252 A1 May 6, 2021

(51) Int. Cl.
*C06C 5/00* (2006.01)
*B64F 5/10* (2017.01)
*B64D 25/08* (2006.01)

(52) U.S. Cl.
CPC ............... *C06C 5/00* (2013.01); *B64D 25/08* (2013.01); *B64F 5/10* (2017.01)

(58) Field of Classification Search
CPC ..... B64C 1/32; C06C 5/04; C06C 5/00; F42B 3/093

USPC ...... 102/377, 378, 305, 275.1, 275.5, 275.8, 102/275.12; 244/122 AF, 137.2
See application file for complete search history.

(56) References Cited

U.S. PATENT DOCUMENTS

| | | | |
|---|---|---|---|
| 3,454,245 A | 7/1969 | Burkdoll et al. | |
| 3,486,410 A * | 12/1969 | Lake | F42B 3/093 89/1.14 |
| 3,778,010 A * | 12/1973 | Potts | B64C 1/1476 244/121 |
| 3,782,284 A | 1/1974 | Gibb et al. | |
| 5,392,684 A * | 2/1995 | Renfro | F42B 15/38 102/378 |
| 6,286,430 B1 * | 9/2001 | Salort | F42B 15/38 102/312 |
| 9,937,996 B2 | 4/2018 | Joern et al. | |
| 2011/0167994 A1 * | 7/2011 | Au-Yeung | F42B 1/00 89/1.14 |
| 2020/0284559 A1 * | 9/2020 | Gordon | C06C 5/04 |

* cited by examiner

*Primary Examiner* — Reginald S Tillman, Jr.
(74) *Attorney, Agent, or Firm* — Snell & Wilmer L.L.P.

(57) ABSTRACT

A pyrotechnic egress system for a structure may comprise an explosive cord, an outer sheath disposed about the explosive cord, and a stress concentrator coupled to the outer sheath. The stress concentrator may comprise a triangular cross section. The stress concentrator may include a standoff structure.

10 Claims, 9 Drawing Sheets

DETONATING CORD STRESS CONCENTRATORS

FIELD

The disclosure relates generally to aircraft escape systems and more particularly to pyrotechnic escape systems including an explosive cord.

BACKGROUND

Pyrotechnic egress systems explosively sever materials such as aircraft canopy transparencies, egress panels, and other structural members (i.e. the target material). The target material absorbs a portion of the explosive energy and is thereby severed. Operation of this type of system may communicate at least some explosive energy inwards toward the crew in the form of a pressure wave. Furthermore, for aircraft which operate in a maritime environment, the pressure wave may be transmitted with less energy loss per unit distance in an underwater egress situation relative to a surface (i.e., atmospheric) egress scenario. In an underwater egress situation, the physical properties of water (e.g., density) may tend to inhibit severing the target material. In this regard, it is desirable that the portion of the explosive energy which travels relatively inward toward the crew be minimized and the portion of the explosive energy received by the target material be maximized.

SUMMARY

In various embodiments the present disclosure provides a pyrotechnic egress system for a structure comprising an explosive cord, an outer sheath disposed about the explosive cord, and a stress concentrator coupled to the outer sheath.

In various embodiments, the stress concentrator comprises a triangular cross section. In various embodiments, the stress concentrator defines a cavity therewithin. In various embodiments, the stress concentrator is continuous along the outer sheath. In various embodiments, the stress concentrator is segmented. In various embodiments, the stress concentrator is integral to the outer sheath. In various embodiments, the stress concentrator includes a standoff structure.

In various embodiments, the present disclosure provides an explosively severable structure comprising a structure, an explosive cord coupled to the structure, and a stress concentrator coupled relatively between the structure and the explosive cord.

In various embodiments, the stress concentrator is coupled to an outer sheath of the explosive cord. In various embodiments, the stress concentrator comprises a triangular cross section. In various embodiments, the stress concentrator defines a cavity therewithin. In various embodiments, the stress concentrator is continuous along the outer sheath. In various embodiments, the stress concentrator is segmented. In various embodiments, the stress concentrator is integral to the outer sheath. In various embodiments, the stress concentrator includes a standoff structure.

In various embodiments, the present disclosure provides a method of s manufacturing an explosively severable structure comprising coupling a stress concentrator to an explosive cord, coupling the explosive cord to a structure wherein the stress concentrator is disposed relatively between the structure and the explosive cord, wherein the stress concentrator is configured to shear the structure in response to a detonation of the explosive cord.

In various embodiments, the stress concentrator comprises a triangular cross section. In various embodiments, the stress concentrator is continuous along the explosive cord. In various embodiments, the stress concentrator is segmented. In various embodiments, the stress concentrator includes a standoff structure.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
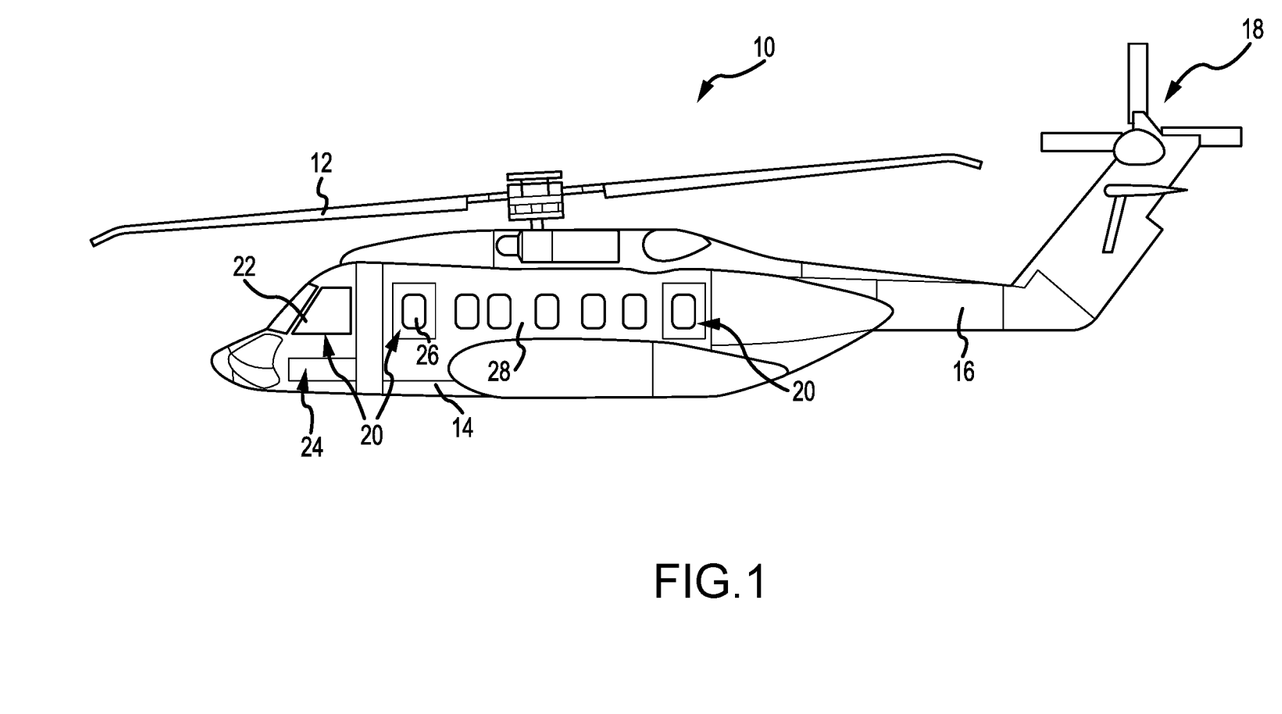
FIG. 1 illustrates an exemplary aircraft including a pyrotechnic escape system, in accordance with various embodiments.

In various embodiments and with reference to FIG. 1, an exemplary aircraft 10 is illustrated. The aircraft 10 may be a vertical takeoff and landing (VOTL) and/or rotary wing aircraft such as, for example, a helicopter. Aircraft 10 includes an airframe 14 having a tail boom 16 coupled to an anti-torque system 18. A rotor system 12 provides lift to the airframe 14 tending thereby enable the VTOL capability of aircraft 10. Although aircraft 10 is illustrated in configuration as a helicopter, it will be appreciated by those skilled in the art that many other configurations, machines, and/or structures will also benefit herefrom.

In various embodiments, aircraft 10 includes one or more explosively severable structures 20 which are appropriately sized to facilitate the rapid egress of passengers and/or crewmembers in the event of an emergency situation. The explosively severable structure 20, in one non-limiting embodiment, may be a cockpit window 22 which may partially define an aircraft cockpit 24 and a cabin window 26 which may partially define an aircraft cabin 28.

Figure 2:
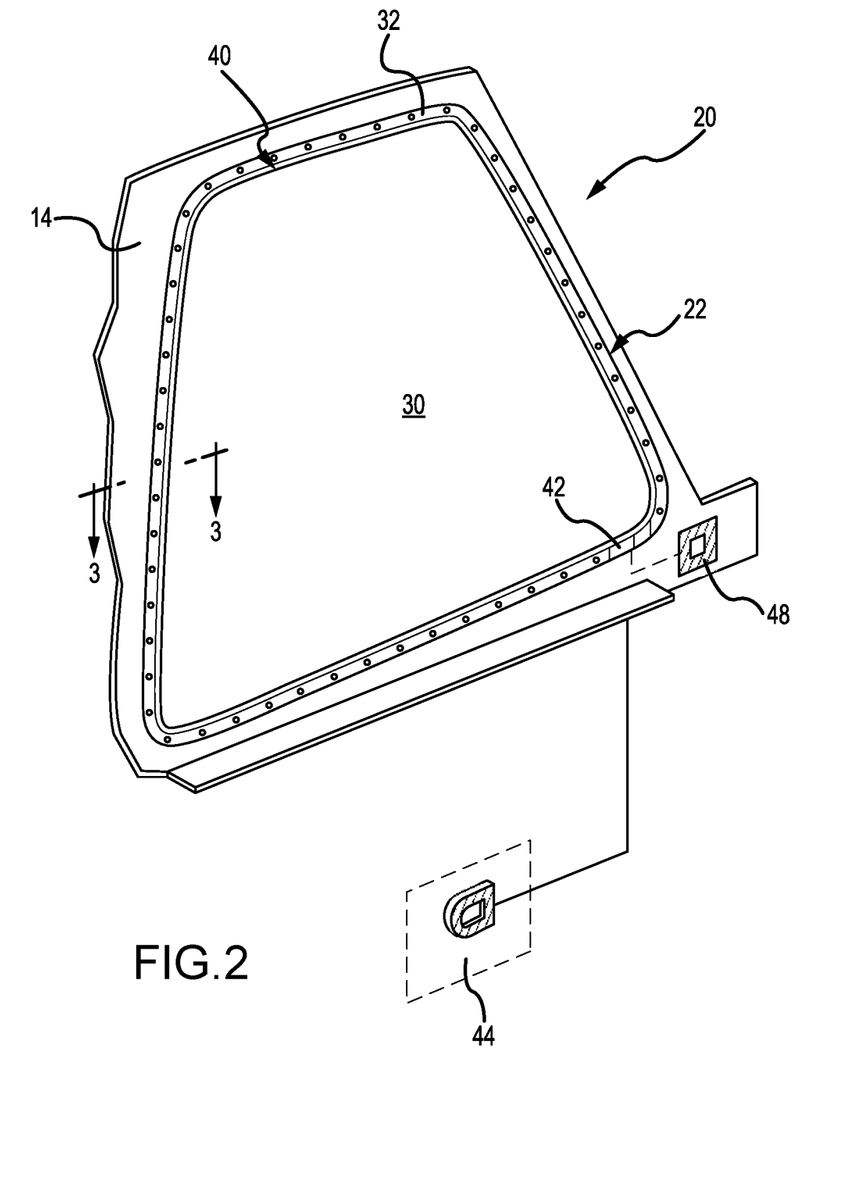
FIG. 2 illustrates an isolated perspective view of a pyrotechnic escape system, in accordance with various embodiments.

In various embodiments and with additional reference to FIG. 2, the explosively severable structure 20 is illustrated in an isolated perspective from within the aircraft. The window 22, 26 generally includes a transparency 30 bordered and supported by a panel frame 32. The transparency 30 may be manufactured from, for example, a glass, a polycarbonate, a polycarbonate laminate, an acrylic or acrylic/polycarbonate laminates and/or the like.

A pyrotechnic egress system 40 is located about the periphery of the transparency 30 to essentially separate the transparency from the panel frame 32. It should be understood that the pyrotechnic egress system 40 need not be limited to only a transparency and may be utilized to sever other structures to thereby provide an egress exit therethrough The pyrotechnic egress system 40 may be activated through an initiator 42 which may be activated from outside the aircraft 10 via an ignition interface such as, for example, by pulling a handle 44. The pyrotechnic egress system 40 may also be activated from within the aircraft 10 via an ignition interface such as, for example, by pulling a handle 48. The initiator 42 may include boost charges to fire the pyrotechnic egress system 40. It should be understood that although manual activation through pulling of handle 44 or 48 is typical, other activation systems may alternatively or additionally be utilized. For example, the initiator 42 may be a percussion type initiator such as a lanyard pull imitator having a lanyard coupled to each of the handles 44 and 48. In another example, the initiator 42 may be an electrical initiator and may be electrically coupled to handles 44 and 48 which may be configured to close an electrical pathway providing a firing current to the initiator 42.

Figure 3:
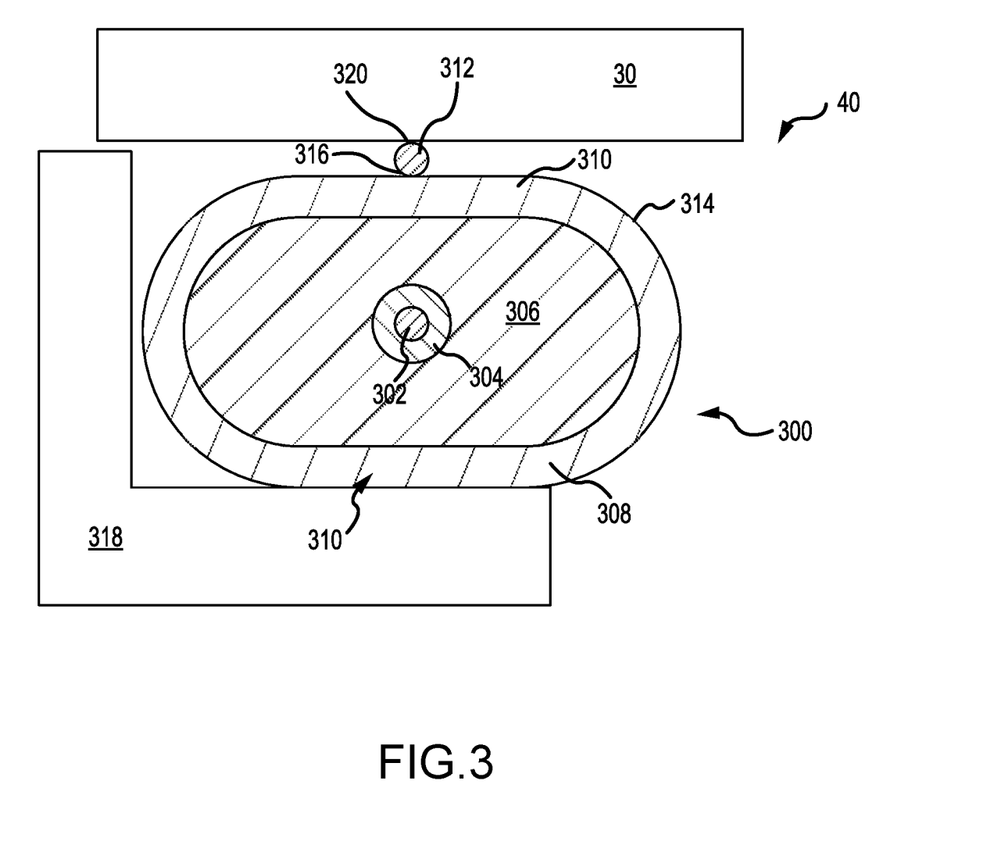
FIG. 3 illustrates a cross sectional view of a pyrotechnic escape system comprising a stress concentrator, in accordance with various embodiments

In various embodiments and with additional reference to FIG. 3, pyrotechnic egress system 40 is shown in cross section coupled to the transparency 30. The pyrotechnic egress system 40 includes an explosive cord such as, for example, Jetcord®, X-Cord®, TLX®, ITLX®, and/or other linear ignition systems. In various embodiments, the explosive cord may comprise a shielded mild detonating cord (SMDC) 300. The SMDC 300 includes an explosive material 302 which fills and is contained within an inner casing material 304. The explosive material 302 may be any suitable explosive material or powdered explosive such as, for example, RDX, HMX, HNS, PETN, TNT, and/or the like. In various embodiments, the inner casing material 304 is a metallic material such as, for example, one of silver or lead alloys.

The inner casing material 304 is surrounded by a relatively flexible and/or elastomeric sleeve material 306 such as, for example, one of a rubber, a synthetic rubber, or a silicone. The elastomeric sleeve material 306 fills and is retained within a protective outer sheath 308. In various embodiments, the outer sheath 308 may comprise a metallic tube such as, for example, one of an aluminum, a copper, a steel, and/or a stainless steel. In various embodiments, the tube may be flattened to take a relatively oblate cross section including one or more flattened portions 310.

A stress concentrator 312 is coupled to the surface 314 of the outer sheath 308 and positioned relatively between the surface 314 of the outer sheath 308 and the transparency 30. In various embodiments, the stress concentrator may be contacted with the transparency 30. A stress concentrator, such as stress concentrator 312 may be coupled to the surface 314 via bonding 316 by any suitable method such as, for example, by welding and/or an adhesive. A stress concentrator such as stress concentrator 312 may extend axially along the surface 314 of the outer sheath 308. In various embodiments, stress concentrator 312 may comprise a continuous or segmented metallic wire. In various embodiments, a stress concentrator such as stress concentrator 312 may be coupled to the surface 314 at the flattened portion 310.

In response to activation of the pyrotechnic egress system 40, the explosive material 302 within the SMDC 300 detonates, thereby tending to expand the outer sheath 308 to its original tubular shape. In response to the expansion of the outer sheath 308, the stress concentrator 312 is driven into the transparency 30 tending thereby to concentrate forces generated by the detonation of the SMDC 300 at a point of contact 320 between the transparency 30 and the stress concentrator 312. In this regard, the stresses on the transparency 30 are increased relative to a contact between the flattened portion 310 and the transparency 30. In this regard, the stress concentrator 312 may tend to shear structures 20 such as the transparency 30 in response to an explosive driving force transmitted by expansion of the outer sheath 308. In various embodiments, a retention means 318 may tend to retain the SMDC 300 proximate the transparency 30 and resist the expansion of the outer sheath 308. In this regard, the retention means 318 tends to direct the forces generated by the detonation of the SMDC 300 into the transparency 300 and further increase the shear at the point of contact 320 between the transparency 30 and the stress concentrator 312.

Figure 4:
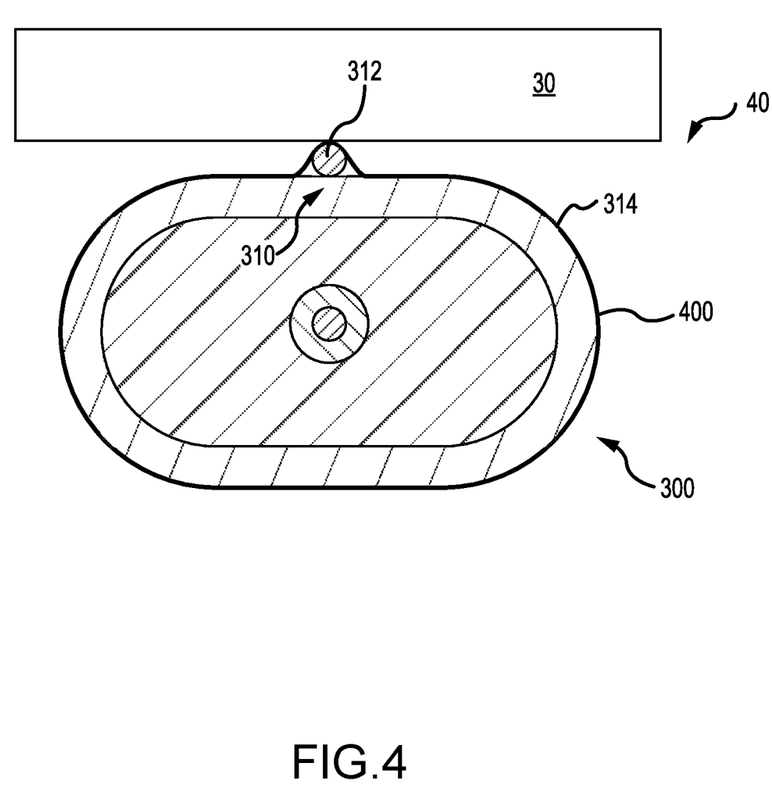
FIG. 4 illustrates a cross sectional view of a pyrotechnic escape system comprising a stress concentrator, in accordance with various embodiments.

With additional reference to FIG. 4, SMDC 300 is shown including an overwrap 400. In various embodiments, overwrap 400 may couple or further retain the stress concentrator 312 to the surface 314 at the flattened portion 310. In various embodiments, the overwrap 400 may comprise a heat shrink polymer, a braid, a tape, and/or the like. In various embodiments, the overwrap 400 may tend to inhibit abrasion, scratching, and/or marring of the transparency 30.

Figure 5A:
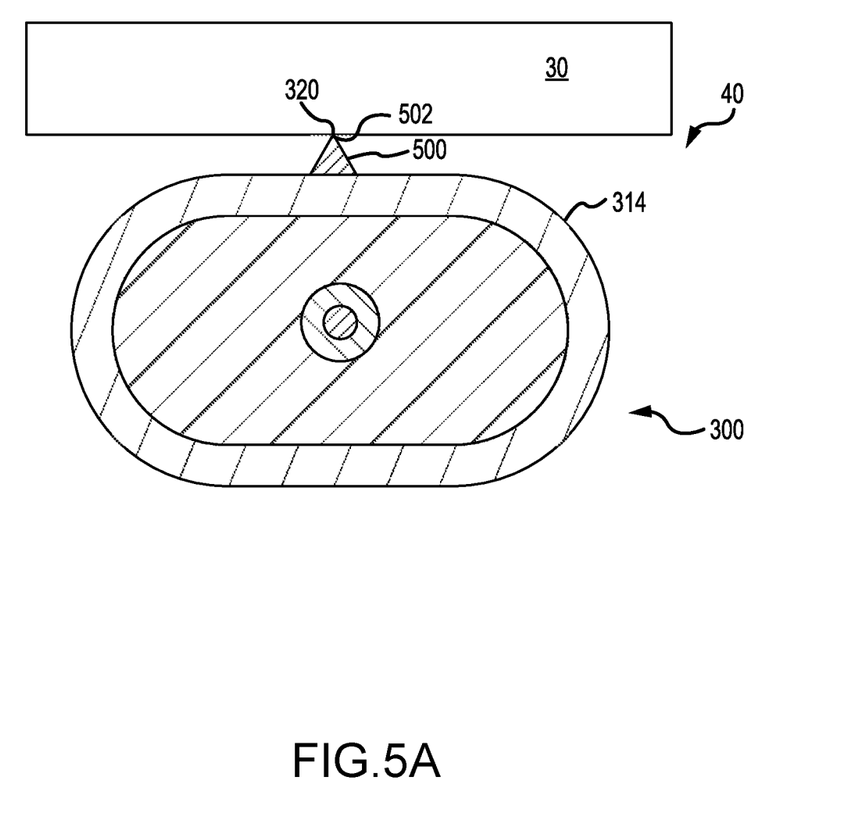
FIG. 5A illustrates a cross sectional view of a pyrotechnic escape system comprising a stress concentrator, in accordance with various embodiments.

With additional reference to FIG. 5A, pyrotechnic egress system 40 is shown in cross section coupled to the transparency 30 and comprising a stress concentrator 500. Stress concentrator 500 comprises various features, materials, geometries, construction, manufacturing techniques, and/or internal components similar to stress concentrator 312.

Stress concentrator 500 is coupled to SMDC 300 and comprises a triangular cross section. A vertex 502 of the stress concentrator 500 defines the point of contact 320 between the stress concentrator 500 and the transparency 30.

Figure 5B:
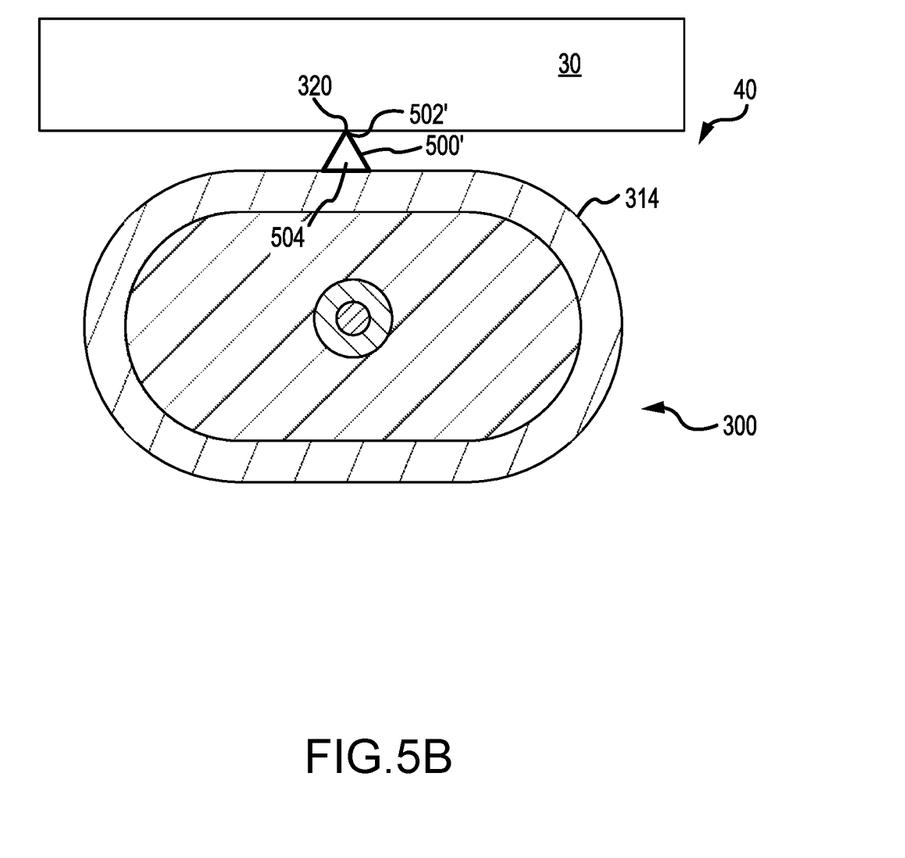
FIG. 5B illustrates a cross sectional view of a pyrotechnic escape system comprising a stress concentrator, in accordance with various embodiments.

With additional reference to FIG. 5B, pyrotechnic egress system 40 is shown in cross section coupled to the transparency 30 and comprising a stress concentrator 500'. Stress concentrator 500' comprises various features, materials, geometries, construction, manufacturing techniques, and/or internal components similar to stress concentrators 312 and 500. Stress concentrator 500' is coupled to SMDC 300 and comprises a triangular cross section defining a cavity 504 therewithin. Stated another way, stress concentrator 500' defines a hollow triangular cross section. A vertex 502' of the stress concentrator 500' defines the point of contact 320 between the stress concentrator 500 and the transparency 30.

Figure 6:
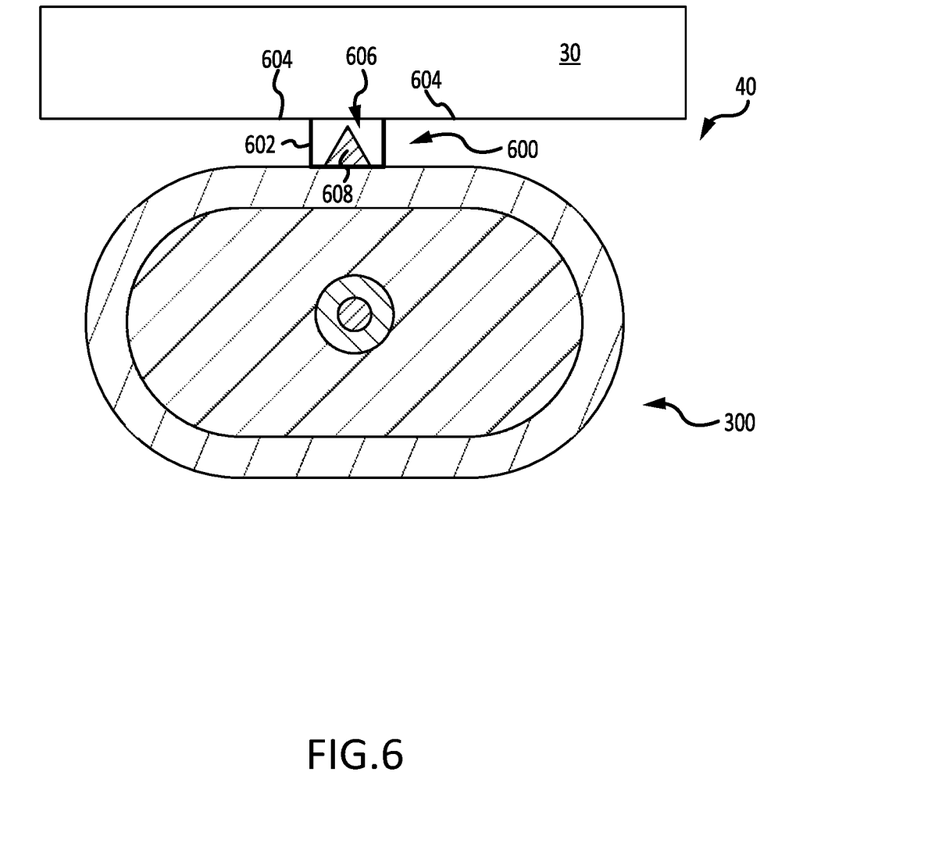
FIG. 6 illustrates a cross sectional view of a pyrotechnic escape system comprising a stress concentrator, in accordance with various embodiments.

With additional reference to FIG. 6, pyrotechnic egress system 40 is shown in cross section coupled to the transparency 30 and comprising a stress concentrator 600. Stress concentrator 600 comprises various features, materials, geometries, construction, manufacturing techniques, and/or internal components similar to stress concentrator 312, 500, and 500'. Stress concentrator 600 is coupled to SMDC 300 and includes one or more integrated standoff structures 602. In various embodiments, the standoff structure 602 may comprise one of a relatively L-shaped cross section, relatively a Z-shaped cross section, a relatively T-shaped cross section, or a relatively I-shaped cross section. The standoff structure 602 may define one or more points of contact 604 with the transparency 30 and thereby generate a standoff gap 606 between the body 608 of stress concentrator 600 and the transparency 30. In this regard, the standoff structure 602 may tend to inhibit abrasion, scratching, and/or marring of the transparency 30 by the body 608 of the stress concentrator 600.

Figure 7:
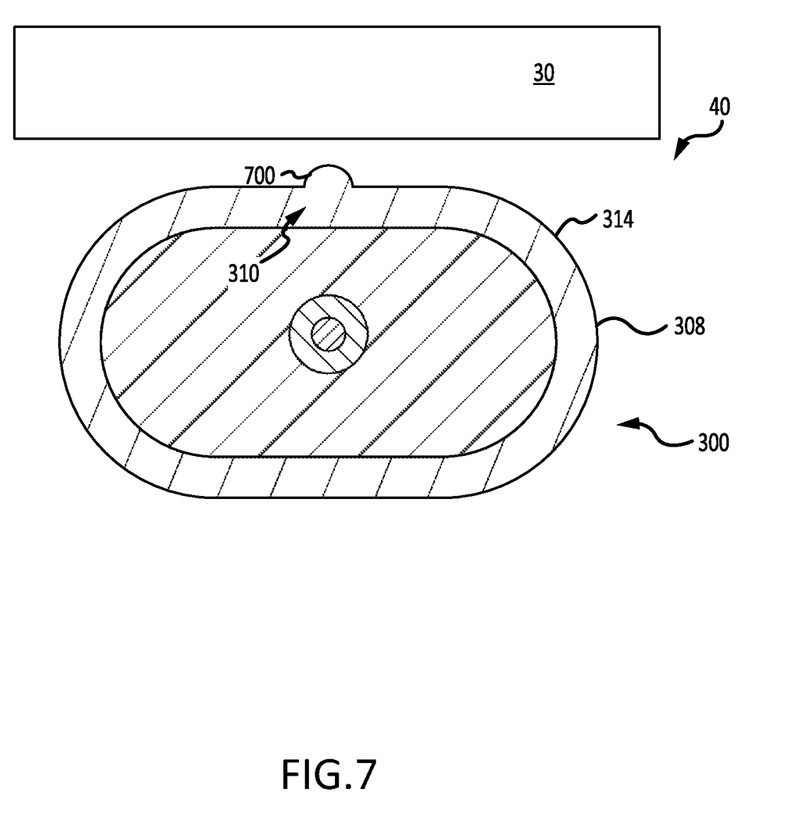
FIG. 7 illustrates a cross sectional view of a pyrotechnic escape system comprising a stress concentrator, in accordance with various embodiments.

With additional reference to FIG. 7, pyrotechnic egress system 40 is shown in cross section coupled to the transparency 30 and comprising a stress concentrator 700. Stress concentrator 700 comprises various features, materials, geometries, construction, manufacturing techniques, and/or internal components similar to stress concentrator 312, 500, 500', and 600. Stress concentrator 700 is formed integrally with the outer sheath 308. Stress concentrator 700 extends radially outward of the surface 314 of the outer sheath 308 at the flattened portion 318.

Figure 8:
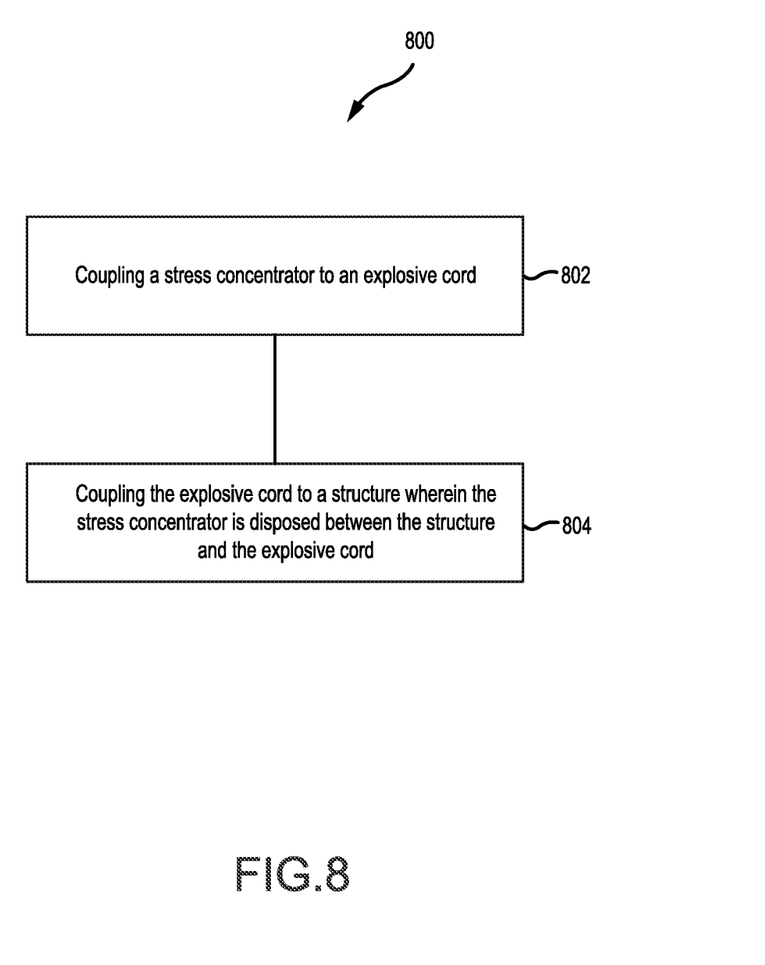
FIG. 8 illustrates a method of manufacturing an explosively severable structure, in accordance with various embodiments.

In various embodiments and with additional reference to FIG. 8, a method 800 of manufacturing an explosively severable structure may comprise coupling a stress concentrator to an explosive cord (step 802). Method 800 includes coupling the explosive cord to a structure wherein the stress concentrator is disposed relatively between the structure and the explosive cord and wherein the stress concentrator is configured to shear the structure in response to a detonation of the explosive cord (step 804).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pyrotechnic system for a structure, comprising:
   an explosive cord;
   an outer sheath disposed about the explosive cord;
   a stress concentrator comprising a protrusion which extends outwardly from an outermost surface of the outer sheath; and
   a standoff structure, wherein a distal end of said standoff structure is spaced further from said outer sheath than said stress concentrator,
   wherein the stress concentrator is coupled to a surface of the outer sheath via bonding.

2. The pyrotechnic system of claim 1, wherein the stress concentrator comprises a triangular cross section.

3. The pyrotechnic system of claim 1, wherein the stress concentrator defines a cavity therewithin.

4. The pyrotechnic system of claim 1, wherein the stress concentrator is continuous along the outermost surface of the outer sheath.

5. The pyrotechnic system of claim 1, wherein the stress concentrator is segmented.

6. The pyrotechnic system of claim 1, wherein the stress concentrator is integral to the outer sheath.

7. A pyrotechnic system for a structure, comprising:
   an explosive cord;

an outer sheath disposed about the explosive cord; and
a stress concentrator comprising a protrusion which extends outwardly from an outermost surface of the outer sheath,
wherein the stress concentrator is coupled to a surface of the outer sheath via bonding, and
wherein the stress concentrator comprises a triangular cross section.

8. The pyrotechnic system of claim 7, wherein the stress concentrator defines a cavity therewithin.

9. The pyrotechnic system of claim 7, wherein the stress concentrator is continuous along the outermost surface of the outer sheath.

10. The pyrotechnic system of claim 7, wherein the stress concentrator is segmented.

\* \* \* \* \*